United States Patent Office 3,506,726
Patented Apr. 14, 1970

3,506,726
PROCESS FOR THE PRODUCTION OF HEPTA-BROMOCYCLOPENTENE AND HEXABROMO-CYCLOPENTADIENE
Delbert L. Hanna, Oak Park, Ill., assignor to Velsicol Chemical Corporation, Chicago, Ill., a corporation of Illinois
No Drawing. Continuation-in-part of application Ser. No. 370,117, May 25, 1964. This application Dec. 19, 1966, Ser. No. 602,569
Int. Cl. C07c 17/00, 23/00
U.S. Cl. 260—648
2 Claims

ABSTRACT OF THE DISCLOSURE

A process for production of the new compound heptabromocyclopentene, hexabromocyclopentadiene, and mixtures thereof, which comprises reacting cyclopentane, cyclopentene, bromocyclopentane or bromocyclopentene containing up to five bromine atoms, or mixtures thereof with a substantial excess of bromine at a temperature above about 150° C. Heptabromocyclopentene is useful as an intermediate in the preparation of hexabromocyclopentadiene.

---

This application is a continuation-in-part of my copending application Ser. No. 370,117, filed May 25, 1964. Hexabromocyclopentadiene is a readily reactive, brominated compound of particular value as an intermediate in the production of a variety of commercial products.

Several processes for the production of hexabromocyclopentadiene are known, principally those based on the work of Straus et al., and Riemschneider et al., consisting of the reaction of cyclopentadiene and sodium hypobromite, hereinafter termed the aqueous processes.

These known aqueous processes entail several disadvantages. Thus, for example, the preparation of hexabromocyclopentadiene by the method of Straus et al., produces low yields of impure product and requires large volumes of process solutions. Moreover, bromine is difficult to recover from the process solutions and tars in these aqueous processes.

It has been found that non-aqueous processes useful for the preparation of hexachlorocyclopentadiene are not operable to produce hexabromocyclopentadiene by use of bromine in place of chlorine. For example, one method of preparing hexachlorocyclopentadiene is the chlorination of tetrachlorocyclopentane to octachlorocyclopentene and then pyrolysis of the latter to hexachlorocyclopentadiene. Upon bromination of tetrabromocyclopentane no octabromocyclopentene is formed. In another process hexachlorocyclopentane, or a mixture containing predominantly this compound, is dehydrogenated to hexachlorocyclopentadiene. This latter process could not be used to prepare hexabromocyclopentadiene since hexabromocyclopentane could not be produced by known methods.

It is therefore one object of the present invention to produce hexabromocyclopentadiene by a direct bromination process.

Another object of the present invention is the production of hexabromocyclopentadiene of high purity substantially free of undesired underbrominated products.

Still another object of the present invention is the production of high purity hexabromocyclopentadiene in commercially practical yields without the necessity of extensive purification procedures.

These and other objects and advantages of the present invention will be readily apparent from the following description.

Unexpectedly it has been found that hexabromocyclopentadiene, a new compound heptabromocyclopentene, and mixtures thereof can be prepared in excellent yields by the direct bromination of a starting material composition selected from the group consisting of cyclopentane, cyclopentene, bromocyclopentane and bromocyclopentene containing up to 5 bromine atoms, and mixtures thereof with a substantial excess of bromine at a temperature above about 150° C. at superatmospheric pressure in the absence of catalyst. A substantial excess of bromine is required in this reaction and at least 5 moles of bromine per mole of the starting material composition above the stoichiometric amount of bromine is preferred.

While hexabromocyclopentadiene is the most desired product of this reaction, by adjustment of the reaction conditions and technique the reaction can be made to produce a mixture of hexabromocyclopentadiene and the new compound, heptabromocyclopentene, or almost pure heptabromocyclopentene.

In one embodiment of the method of the present invention, hexabromocyclopentadiene is produced from the above described starting material composition by heating the starting material composition with excess bromine at a temperature above about 150° C. preferably under superatmospheric pressure, and removing by-product hydrogen bromide. As a practical matter, temperatures below about 250° C. are preferred, although higher temperatures can be used. Pressures of at least the partial pressure of the ingredients are required. Higher pressures can readily be used, such as about 2000 pounds per square inch or higher. Pressures in the range of from the partial pressure of the ingredients to about 800 pounds per square inch are preferred, although higher pressures can be advantageously used as indicated above. Reaction times from about one hour to about 24 hours or more are satisfactory, although longer reaction times can be used with success.

In a preferred embodiment of the present invention, the process is performed so as to produce hexabromocyclopentadiene in situ by removing the by-product hydrogen bromide gas as it is produced by the reaction. One method of performing this removal which is convenient for batch type operation comprises intermittently cooling the reaction mixture and venting the same. In this manner large quantities of unreacted bromine are not lost in the venting, as would occur without the cooling step. The reaction mixture is then again heated under pressure. These steps are repeated until hydrogen bromide gas ceases to be formed by the reaction. Another method of performing the removal, particularly advantageous when continuous operation is desirable, is to selectively condense and vent the vapors under pressure, thereby returning the condensed unreacted bromine to the reaction mixture, but removing the uncondensed hydrogen bromide gas from the reaction mixture without interrupting the operation of heating at superatmospheric pressure. In this manner, a product containing up to 65% or more hexabromocyclopentadiene and lesser amounts of heptabromocyclopentene can be produced.

Alternatively, in another embodiment of the present invention, the process is performed so as to produce heptabromocyclopentene, which is highly useful as an intermediate in the production of hexabromocyclopentadiene. Conversion of heptabromocyclopentene to hexabromocyclopentadiene can be readily performed by removing hydrogen bromide. The hydrogen bromide can be removed effectively by contacting the heptabromocyclopentene with bromine. This conversion can be performed at a temperature of about room temperature or higher. When temperatures of from about room temperature to up to about 75° C. are utilized the reaction rate is very slow. Temperatures above about 80° C. are preferred for the conversion to obtain a practical reaction rate. In the conversion of heptabromocyclopentene to hexabromocyclopentadiene, it is prefered to utilize an excess quantity of bromine. In this procedure it is most preferred to utilize from about 5% to about 15% by weight bromine based on the weight of heptabromocyclopentene and to employ a reaction temperature of from about room temperature to about 95° C., preferably from about 80° to about 95° C., at atmospheric pressure, and higher reaction temperatures such as from about above 95° C. to about 200° C. at superatmospheric pressures. Higher concentrations of bromine will lower the boiling point of the reaction mixture at atmospheric pressure and may require superatmospheric pressures. Thus at higher pressures, greater amounts of bromine and higher temperatures can be advantageously employed. It is preferred to employ the reaction solution in which the heptabromocyclopentene was prepared and to heat the solution at a temperature at which reflux is sustained at the selected operating pressure. In performing the conversion in the presence of excess bromine, conversions of up to 90% or higher of the heptabromocyclopentene to hexabromocyclopentadiene are attained, whereas known processes, such as that of Riemschneider et al., report yields of 60–65%.

The new chemical composition heptabromocylopentene, useful as an intermediate in the production of hexabromocyclopentadiene as herein described, has the formula $C_5HBr_7$, melts at about 135° C. has an infrared spectrogram characterized by strong absorption bands at 8.65 and 12.35 microns and medium absorption bands at 6.4, 8.29, 9.55, 10.0 and 13.99 microns when taken in a potassium bromide disc and a characteristic absorption band at about 3.39 or 3.4 using a concentrated carbon tetrachloride solution, and has a nuclear magnetic resonance spectrum characterized by a single hydrogen band at 5.51 p.p.m.

Heptabromocyclopentene, having the above properties, can be prepared from the starting material composition by the process of the present invention heretofore described. In this process it is preferred to heat the starting material composition at a temperature of above about 150° C. and preferably below about 250° C., and it is most preferred to heat the starting material at a temperature between about 180° C. and about 200° C. As in the production of hexabromocyclopentadiene, pressures of at least the partial pressure of the ingredients are required and higher pressures can readily be used, although pressures above about 2000 pounds per square inch are generally uneconomical, but can be used. Pressures in the range of from the partial pressure of the ingredients to about 800 pounds per square inch have been found to be satisfactory. The same reaction times and proportions of ingredients can be used in this embodiment of the invention as was described for the embodiment wherein hexabromocyclopentadiene was produced.

Although cyclopentane, cyclopentene, or their brominated derivatives containing three or less bromine atoms per molecule can be used as the starting material composition in the preparation of heptabromocyclopentene, hexabromocyclopentadiene, and mixtures thereof, polybrominated cyclopentanes or mixtures thereof having at least four bromine atoms per molecule, and preferably comprised predominantly of tetrabromocyclopentane and pentabromocyclopentane are preferred.

When cyclopentane, cyclopentene, or their monobrominated derivatives are used as the starting material, care must be taken to prevent premature reaction of the starting material with bromine or too rapid a reaction rate, as this reaction is exothermic and can become uncontrollable. One means of preventing premature reaction is to avoid contact of these starting materials with bromine except within the confines of a pressure vessel. With cyclopentane or its monobrominated derivative, premature reaction on contact with bromine can be avoided by exclusion of light and actinic radiation and by use of low temperatures.

A particularly suitable starting material mixture, said mixture having cyclopentane molecules having at least four bromine atoms per molecule and predominantly comprised of tetra- and pentabromocyclopentane, can be readily performed by reacting cyclopentadiene, cyclopentene, or their partially brominated derivatives, such as monobromocyclopentene, and the like, with bromine at a temperature of from about −10° C. to about 15° C., until a minimum of two bromine atoms have been added per mole of cyclopentadiene, cyclopentene, etc., and then reacting the resulting liquid reaction mixture with additional bromine at a temperature of above about 10° C., preferably in the presence of actinic radiation, until a minimum of a total of four bromine atoms have been added per mole of cyclopentadiene, etc.

When cyclopentadiene is used as described above, the cyclopentadiene can be brominated, preferably in a suitable solvent at an initially low temperature, e.g., about −10° C. to about 15° C., so as to add at least two bromine atoms per mole of cyclopentadiene, then at a higher temperature, such as from about 10° C. to about 40° C., and more preferably in the presence of actinic radiation, so as to form a mixture predominantly comprised of tetrabromocyclopentane.

The process of the present invention for producing hexabromocyclopentadiene and the new intermediate described herein are illustrated in the following examples, which are presented to illustrate the invention, but not limit the invention thereto.

EXAMPLE 1

Preparation of heptabromocyclopentene

Carbon tetrachloride (250 ml.) was placed into a one liter, round-bottom flask equipped with a thermometer, mechanical stirrer, vent and a bromine addition funnel. Bromine was placed in the addition funnel and about 10 ml. of the bromine was added to the flask. The mixture was cooled and maintained at −10° C. to 10° C. and increments of bromine and cyclopentadiene were added until 66 grams (1 mol) of cyclopentadiene and 60 ml. of bromine had been added to the flask. At this point the flask contained the product dibromocyclopentene in solution.

Additional bromine (40 ml.) was added to the flask. The contents thereof were maintained at 10°–20° C. in the presence of actinic radiation provided by two 15 watt green fluorescent lamps. The reaction was fairly rapid forming polybromocyclopentane containing at least four and less than six bromine atoms per molecule. The polybromocyclopentane was recovered as the residue after evaporating the reaction mixture, first at room temperature and then in vacuo, and treating the residual oil with sodium carbonate, followed by filtration therefrom.

Polybromocyclopentane (1.4 g.) prepared above, and bromine (6 g.) were sealed inside a glass tube having a capacity 30 cc. and heated at 200° C. for 1¼ hours. The tube was then packed in Dry Ice to liquefy hydrogen bromide formed during the reaction. The sealed tube was opened and the hydrogen bromide allowed to evaporate as the tube and reaction mixture warmed to room temperature. Excess bromine was evaporated from the reaction mixture leaving approximately 2 grams of heptabromocyclopentene as a solid melting at about 135° C.

EXAMPLE 2

Preparation of heptabromocyclopentene

Polybromocyclopentane (10 g.), prepared as described in Example 1, and bromine (40 g.) were placed and sealed in a 175 cc. nickel cylindrical reactor. The reactor was heated at 190° C. for 4 hours with hot oil circulating in a heating jacket. After cooling, the excess bromine was evaporated, and the reaction mixture was dissolved in hot heptane and a crystalline product precipitated on cooling. This product was washed with heptane-pentane mixture yielding a crude product on filtration. The crude product was recrystallized from heptane to yield heptabromocyclopentene as a colorless to light yellow solid, melting 135°–136° C., having a molecular weight of 618 as compared to a theoretical molecular weight of 620.4, and the following elemental analysis:

Calculated for $C_5HBr_7$.—Theoretical (percent): C, 9.68; H, 0.16; Br, 90.16. Found (percent): C, 9.81; H, 0.47; Br, 90.4.

Infrared and nuclear magnetic resonance studies of the purified product confirmed that the above identified product was obtained. The infrared spectrogram contained strong absorption bands at 8.65 and 12.35 microns and medium absorption bands at 6.4, 8.29, 9.55, 10.0 and 13.99 microns when taken in a potassium bromide disc, and a characteristic absorption band at about 3.39–3.4 microns using a concentrated carbon tetrachloride solution. The nuclear magnetic resonance spectrogram contained a single hydrogen band at 5.51 p.p.m.

EXAMPLE 3

Preparation of heptabromocyclopentene

Polybromocyclopentane (5 g.) prepared as described in Example 1, and bromine (40 g.) were placed and sealed in a 175 cc. cylindrical nickel reactor. The reactor was heated at 180° C. for 4 hours with hot oil circulating through a heating jacket. Upon cooling, the contents of the reactor were removed and the excess bromine evaporated, to yield a precipitated crude product. This product was washed with heptane and recrystallized therefrom to yield heptabromocyclopentene as a colorless to light yellow solid melting 135°–136° C.

EXAMPLE 4

Preparation of heptabromocyclopentene

Carbon tetrachloride (500 ml.) was placed into a three-liter, three-necked, round bottom flask fitted with a thermometer, a mechanical stirrer, a cyclopentadiene addition tube which opened beneath the surface of the carbon tetrachloride, a bromine addition funnel, and a vent. With the contents of the flask maintained at 0° to 10° C. small increments of bromine at room temperature and very cold cyclopentadiene were added over a period of about 20 minutes, always maintaining an excess of bromine in the reaction mixture, until one mole of cyclopentadiene (66 g.) and one mole of bromine had been added, forming dibromocyclopentene.

The temperature of the reaction mixture was raised to 20° to 30° C. and an excess above the stoichiometric requirement of one mole of bromine was added. With the reaction temperature maintained at 20° C. to 30° C., the reaction mixture was subjected to actinic radiation from two, 15 watt, blue fluorescent lamps for a period of about 20 minutes, forming polybromocyclopentane containing at least four and less than six bromine atoms per molecule. The said polybromocyclopentane was recovered as a residual oil by the method described in Example 1.

Polybromocyclopentane (60 g.) prepared as described above and bromine (480 g.) were charged to a 1400 cubic centimeter capacity, cylindrical nickel reactor. The reactor was sealed and then heated by circulating hot oil through a heating jacket. In this manner the temperature of the hot oil was slowly increased over a period of about 2 days from room temperature to about 185° C. while the pressure in the reactor correspondingly increased from atmospheric pressure to 280 pounds per square inch. Upon cooling, and treating the reaction mixture as described in the previous example, a mixture of heptabromocyclopentene, having properties similar to the properties of the product of Example 2 and a small amount of hexabromocyclopentadiene, was obtained.

EXAMPLE 5

Preparation of heptabromocyclopentene

Into the reactor described in the previous example was charged and sealed polybromocyclopentane (600 g.) prepared as described in Example 4, and bromine (1360 g.), The temperature of the hot oil was increased to 183° C. over a period of about 16 hours, while a corresponding increase in the pressure in the reactor of from atmospheric pressure to about 675 pounds per square inch was noted. Upon cooling the reactor and treating the contents as described in Example 3, more than 650 grams of crude product were recovered, which when purified yielded heptabromocyclopentene having properties similar to the properties of the product of Example 2.

EXAMPLE 6

Preparation of heptabromocyclopentene

Cyclopentane (20 g.) and bromine (2400 g.) were charged and sealed into the reactor described in Example 4, which was flushed and pressured to a slight pressure with nitrogen gas. Care was taken to prevent any reaction between the ingredients prior to sealing although the ingredients were mixed with the exclusion of light prior to placement in the reactor. The initial pressure due to the nitrogen gas was about 50 pounds per square inch. A positive pressure was required to maintain the contact between the cyclopentane and the bromine at the start of the reaction. The contents of the reactor were heated rapidly to 150° C. over a period of about 70 minutes as the pressure increased to 100 pounds per square inch. Thereafter the temperature of the contents was slowly increased to 201° C. over a period of 6 hours and 25 minutes while the pressure in the reactor increased to 475 pounds per square inch. Upon cooling, the contents of the reactor were removed and the excess bromine evaporated to yield heptabromocyclopentene having a purity of about 75–80% as determined by infrared analysis.

Example 7

Preparation of hexabromocyclopentadiene

A mixture (20 g.) of heptabromocyclopentene and hexabromocyclopentadiene, prepared in Example 4, was mixed with bromine and refluxed at 90–95° C. for about 3 hours. Bromine was removed from the mixture by pouring the reaction mixture in a petri dish and allowing the bromine to evaporate at room temperature yielding a crystalline product. Infrared spectroscopy studies of the product as compared to the starting material and hexabromocyclopentadiene prepared by a known process having a melting point of 86.8–87.5° C. indicated that at least 90% of the heptabromocyclopentene had been converted to hexabromocyclopentadiene.

EXAMPLE 8

Preparation of hexabromocyclopentadiene

Polybromocyclopentane (8 g.), prepared as described in Example 4, and bromine (40 g.) were charged into the nickel reactor described in Example 3, the reactor was sealed and then heated to about 55° C. over a period of about 6 hours. Thereafter the reactor was heated at about 185° C. for 4 hours. The reactor was cooled and vented, then resealed, reheated to 180° C. over a period of about 20 minutes, cooled and vented. A crude crystalline product was recovered. Infrared spectroscopy studies were made on this material as described in the previous example, which indicated that the product contained about 45% hexabromocyclopentadiene and about 35% heptabromocyclopentene.

EXAMPLE 9

Preparation of hexabromocyclopentadiene

Polybromocyclopentane (8 g.), prepared as described in Example 4, and bromine (50 g.), were placed in the reactor described in the previous example. The reactor was then successively heated, cooled, and vented according to the following schedule.

| Heating period to cooling and venting, hrs.: | Temperature reached at end of heating cycle, °C. |
|---|---|
| 2 | 135 |
| 3 | 165 |
| 2 | 170 |
| 1 | 190 |
| 1 | 195 |
| 1 | 200 |
| 1 | 180 |
| 1 | 195 |
| 1 | 195 |

The contents of the reactor were removed from the reactor and evaporated, yielding 11.2 grams of product. Infrared spectroscopy studies indicated that the product contained about 65% hexabromocyclopentadiene and about 13% heptabromocyclopentene.

EXAMPLE 10

Preparation of hexabromocyclopentadiene

A portion of the reaction mixture from a preparation of heptabromocyclopentene by sealing polybromocyclopentane containing at least four bromine atoms per molecule in a bomb with bromine and heating at 195° C., was placed in a glass bottle, loosely stoppered, and allowed to stand for one month at room temperature. At the end of this time, from about 50% to about 65% of the heptabromocyclopentene originally present in the reaction mixture had been converted to hexabromocyclopentadiene, as shown by infrared spectroscopy studies on the recovered product of the reaction mixture prior and subsequent to the one month period.

EXAMPLE 11

Preparation of hexabromocyclopentadiene

Dibromocyclopentane (39.7 parts by weight) and bromine (336 parts by weight) were placed in a nickel-iron alloy (Hastelloy) autoclave reactor. The reactor was sealed and the reaction mixture heated at about 165° C. for a period of 22 hours. The maximum pressure developed in the reactor during this period was about 790 pounds per square inch. The reaction mixture was cooled to about 120° C. and the reactor vented for four hours. Thereafter the reaction mixture was cooled to room temperature and excess bromine evaporated from the mixture. The crude crystalline product which was obtained as the residue was analyzed by infrared spectroscopy. The product was found to contain 70–72% hexabromocyclopentadiene and 1% heptabromocyclopentene.

The following example further illustrates the conversion of the new intermediate heptabromocyclopentene to hexabromocyclopentadiene by dehydrobromination.

EXAMPLE 12

Heptabromocyclopentene (0.1009 g.) was charged to a cylindrical glass reaction tube ¾ inch in diameter and 9 inches long having a dip tube and a vent to a liquid gas trap. Freshly distilled liquid bromine (2 cc.) was added to the tube. The reaction tube was placed in an Erlenmeyer flask of water which was heated to boiling in 23 minutes and maintained at 100° C. for 3 hours. Some bromine was expelled from the reaction tube, leaving a portion dissolved in the reaction mixture and a portion of the bromine condensed at the top of the tube which continually refluxed part way down the tube supplying a bromine atmosphere to the reaction zone.

The tube was then cooled to room temperature and vented for a few minutes to remove bromine. The reaction mixture was dissolved in carbon disulfide (2 ml.) and analyzed by infrared spectroscopy which indicated that 83% of the heptabromocyclopentene had been converted to hexabromocyclopentadiene while 17% had remained unchanged.

It is surprising that hexabromocyclopentadiene should be formed from heptabromocyclopentene by dehydrobromination since dehydrochlorination of heptachlorocyclopentene to hexachlorocyclopentadiene does not occur when heptachlorocyclopentene is treated under similar conditions, as shown in the following example:

EXAMPLE 13

Heptachlorocyclopentene (0.0994 g.) was placed in the reaction tube described in Example 12. The dip tube was connected to a cylinder of chlorine gas and the apparatus flushed with the gas. Thereafter chlorine gas was introduced to the reaction tube at a slow rate and, due to the liquid trap, an atmosphere of chlorine was maintained in the reaction tube. The tube was placed in an Erlenmeyer flask of water which was heated to boiling in 23 minutes and maintained at 100° C. for 3 hours. The tube was then cooled to room temperature and vented for a few minutes to remove chlorine. The reaction mixture was dissolved in carbon disulfide (2 ml.) and analyzed by infrared spectroscopy which indicated that no measurable amount of hexachlorocyclopentadiene had been formed, but that the reaction mixture contained about 93% heptachlorocyclopentene and about 7% octachlorocyclopentene.

I claim:

1. A process for the production of heptabromocyclopentene comprising reacting in a sealed vessel a composition selected from the group consisting of cyclopentane, cyclopentene, bromocyclopentane and bromocyclopentene containing up to 5 bromine atoms, with at least 5 moles of bromine above the stoichiometric amount of bromine needed, per mole of starting composition, at a temperature between 150° and 250° C. in the absence of catalyst.

2. A process for the production of hexabromocyclopentadiene which comprises reacting in a sealed vessel a composition selected from the group consisting of cyclopentane, cyclopentene, bromocyclopentane and bromocyclopentene containing up to 5 bromine atoms with at least 5 moles of bromine above the stoichiometric amount of bromine needed, per mole of starting composition, at a temperature between 150° C. and 250° C., in the absence of a catalyst, hydrogen bromide being removed during the course of the reaction.

References Cited

UNITED STATES PATENTS

| 2,299,441 | 10/1942 | Vaughan et al. | 260—648 |
| 2,900,420 | 8/1959 | Lidov | 260—648 |

OTHER REFERENCES

Groggins "Unit Processes in Org. Synthesis," pp. 247 to 249 and 258 (1955).

Prins Rec. Trav. Chim., vol. 55, pp. 456 to 457 (1946).

LEON ZITVER, Primary Examiner

H. T. MARS, Assistant Examiner

U.S. Cl. X.R.

204—163